United States Patent Office 3,483,159
Patented Dec. 9, 1969

3,483,159
RIGID POLYVINYL CHLORIDE RESINS HAVING ENHANCED RESISTANCE TO DETERIORATION DUE TO THE PRESENCE OF AN ORGANOTIN UNSATURATED HALF ESTER AND AN UNHINDERED PHENOL
Otto S. Kauder, Jamaica, N.Y., assignor to Argus Chemical Corporation, Brooklyn, N.Y., a corporation of New York
No Drawing. Continuation of application Ser. No. 474,980, July 26, 1965. This application May 22, 1967, Ser. No. 640,425
Int. Cl. C08f 45/58, 45/62
U.S. Cl. 260—45.75  8 Claims

ABSTRACT OF THE DISCLOSURE

The resistance to deterioration when heated of rigid polyvinyl chloride resin compositions is improved by incorporating therein a stabilizer composition containing an organotin compound having organic radicals linked to tin only through carbon and oxygen wherein at least two of the radicals are linked through carbon and at least one radical is linked to tin through oxygen to a carboxyl group of a half ester of an unsaturated aliphatic dicarboxylic acid with an alcohol having from one to two hydroxyl groups, and a phenol compound having at least one hydrogen atom ortho to a phenoilic hydroxyl group.

---

This application is a continuation of application Ser. No. 474,980, filed July 26, 1965, now abandoned, which was a continuation-in-part of application Ser. No. 164,974, filed Jan. 8, 1962, and now abandoned.

This invention relates to rigid, i.e. unplasticized, polyvinyl chloride resin compositions containing an organotin compound and a phenol compound containing at least one hydrogen atom ortho to one hydroxyl group and having, as a result, an improved resistance to deterioration when heated at temperatures of 375° F. and higher.

Many organotin compounds are now widely recognized as the best available single-compound stabilizers for polyvinyl chloride resins. Even the best of these, however, is not always satisfactory.

Numerous types of organotin compounds have been proposed for stabilization of polyvinyl chloride resins, among them, the alkyl tin mercaptides and alkyl tin mercaptoesters described in U.S. Patent Nos. 2,914,506 to Mack, 2,801,258 and 2,891,922 to Johnson, 2,726,254 and 2,870,119 to Leistner, 2,726,227 to Leistner, and 2,641,588 to Leistner, and 2,954,363 to Kuehne; the alkyl tin mercaptoacid ester compounds, described in U.S. Patent No. 2,641,596; the alkyl tin amides of thio acids described in U.S. Patent No. 2,704,756 to Leistner; and the alkyl tin cyclic glycol thio acid esters described in U.S. Patent No. 2,752,325 to Leistner; the alkyl tin xanthates described in U.S. Patent No. 2,759,906 to Leistner; and the alkyl tin esters of mercapto alcohols of U.S. Patent Nos. 2,870,119, 2,870,182, 2,872,468 and 2,883,363 to Leistner et al.

These organotin compounds have in common a hydrocarbon group directly attached to tin through a carbon atom, and a sulfur-containing radical attached to the tin through the sulfur atom. This combination of radicals is recognized as giving optimum stabilization, from the standpoint of clarity and minimizing loss of hydrogen halide from the resin. However, sulfur-containing radicals introduce an odor problem.

Several types of organotin compounds have been suggested in which the tin is not linked to sulfur. These compounds have a hydrocarbon group directly attached to tin through a carbon atom, and an oxygen-containing group, such as an alkoxy or an ester group, attached to tin through oxygen. Typical of these compounds are those described in U.S. Patent Nos. 2,938,013, to Mack et al. and 2,680,107 to Leistner et al. However, the oxygen-containing radicals do not impart as good a stabilizing effect as sulfur radicals.

U.S. Patent No. 2,307,157 to Quattlebaum et al. suggests the use of sulfur-free organotin carboxylates as the sole color-stabilizing agents for vinyl chloride compositions. These compounds are not as effective as sulfur-containing compounds, although certain compounds, such as, for example, the bis-(dialkyltin monoester) maleates, complex compounds containing two tin atoms per molecule, give some degree of protection.

Leistner et al. in U.S. Patent 2,564,646 disclose the use of organic phosphites as anti-clouding agents in conjunction with polyvinyl chloride stabilizers including various organic and inorganic lead salts, calcium, strontium, barium, cadmium, zinc, and tin salts of fatty acids, various organotin compounds including dibutyl tin oxide, dibutyl tin laurate, dibutyl tin maleate, and tetraphenyl or tetraalkyl tin. The patentees state that if less effective anti-clouding action is acceptable, then the phosphites can be replaced by organic sulfides or by hindered phenols. As indicated in the Leistner et al. patent, a hindered phenol is a phenol in which there are alkyl groups ortho to each phenolic hydroxyl group and hence in which there are no hydrogen atoms in the ortho position.

In accordance with the present invention, rigid polyvinyl chloride resins having improved resistance to deterioration when heated at 375° F. for up to one hour are provided comprising an organotin compound free from sulfur, but having as good a stability as polyvinyl chloride resins containing an organotin sulfur compound, and less odor. The rigid polyvinyl chloride resins of the invention comprise a phenol compound and an organotin salt of a half ester of an unsaaturated aliphatic dicarboxylic acid. The phenol compound should contain at least one hydrogen atom ortho to a hydroxyl group and alone imparts no observable stabilizing effect, but synergizes the stabilizing effect of the organotin compound such that both together are far more effective than either alone.

The rigid polyvinyl chloride resin is afforded optimum protection by means of the stabilizer combination of this invention.

The organotin compounds may be characterized as having organic groups linked to tin by means of carbon and/ or oxygen atoms only.

The organotin compound can be either monomeric or polymeric but is preferably monomeric. The preferred organotin compounds used in the invention can be further defined by the formula:

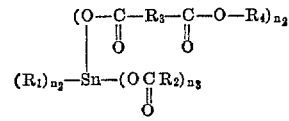

In the above formula, $R_1$ and $R_2$ are hydrocarbon radicals having from about one to about thirty carbon atoms, which can contain inert substituent groups such as halogen, ether and ester groups.

$R_1$ can, for example, be an aliphatic group such as alkyl and alkenyl, cycloaliphatic group such as cycloalkyl and cycloalkenyl, or heterocyclic group, such as methyl, ethyl, propyl, propenyl, isopropyl, n-butyl, butenyl, vinyl, isobutyl, tert-butyl, sec-butyl, amyl, hexyl, octyl, oleyl, 2-ethylhexyl, iso-octyl, lauryl, stearyl, behenyl, allyl, furfuryl, cyclohexyl, cyclopentyl, tetrahydropyranyl and tetrahydrofurfuryl.

The

group can be derived from an organic mono or poly carboxylic acid, saturated or unsaturated, of the formula $R_2COOH$ including aliphatic, aromatic, cycloaliphatic and heterocyclic acids, which can contain inert substituents such as halogen, hydroxyl, keto and alkoxy groups, such as, for example, acetic acid, propionic acid, oleic acid, ricinoleic acid, linoleic acid, stearic acid, butyric acid, valeric acid, chloroacetic acid, hexanoic acid, octanoic acid, lactic acid, levulinic acid, 4-methoxy butyric acid, lauric acid, behenic acid, linoleic acid, palmitic acid, benzoic acid, methylbenzoic acid, cyclohexane carboxylic acid and furoic acid.

$R_3$ is a hydrocarbon group having from about one to about thirty carbon atoms and containing an ethylenic double bond. The ethylenic double bond is located such that in an acid of the formula

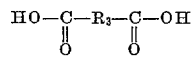

the said double bond is alpha to a carboxyl group. The $R_3$ groups are derived from alpha unsaturated dicarboxylic acids containing from about four to about ten carbon atoms, such as maleic acid, fumaric acid, itaconic acid, glutaconic acid, 2-hydromuconic acid, citraconic acid, 2-hexene-1,4-dicarboxylic acid, 2-octene-1,8-dioic acid, cyclohexene-1,2-dicarboxylic acid and 2,5-heptadienedioic acid.

$R_4$ is an organic group derived from a monohydric or polyhydric alcohol of the formula $R_4—(OH)_{n_4}$ where $n_4$ is an integer from one to about four but is preferably one or two. Thus, $R_4$ can be alkyl, alkylene, alkenyl, aryl, arylene, mixed alkyl-aryl, mixed aryl-alkyl, cycloaliphatic and heterocyclic and can contain from about one to about thirty carbon atoms and can also contain ester groups, alkoxy groups, hydroxyl groups, halogen atoms and other inert substituents. Preferably $R_4$ is derived from dihydric alcohols, such as glycols containing from two to about thirty carbon atoms, including ethylene glycol, propylene glycol, diethylene glycol, dipropylene glycol, tetramethylene glycol, neopentyl glycol and decamethylene glycol or from monohydric alcohols containing from one to about thirty carbon atoms, such as methyl, ethyl, propyl, n-butyl, t-butyl, isobutyl, octyl, decyl and lauryl alcohols.

The sum of $n_1$ $n_2$ and $n_3$ is four, $n_1$ is either two or three, $n_2$ can range from one to two and $n_3$ can range from zero to one. Preferably, $n_2$ is either one or two and $n_3$ is either zero or one.

The following organotin compounds are typical of those coming within the invention:

1. $C_2H_5$–Sn($n$-$C_4H_9$)(O–C(O)–CH=CH–C(O)–O–$C_8H_{17}$)$_2$ 2. iso-$C_4H_9$–Sn(iso-$C_4H_9$)(O–C(O)–CH=CH–C(O)–O–(CH$_2$)$_3$–OH)$_2$ 3. iso-$C_3H_7$–Sn(iso-$C_3H_7$)(O–C(O)–CH=CH–C(O)–O–(CH$_2$)$_3$–O–(CH$_2$)$_3$OH)$_2$ 4. $n$-$C_4H_9$–Sn($n$-$C_4H_9$)(O–C(O)–CH=CH–C(O)–O–(CH$_2$)$_3$–O–(CH$_2$)$_3$–OH)(O–C(O)–C$_6$H$_{11}$)

5. $n$-$C_4H_9$–Sn($C_{11}H_{23}$)(O–C(O)–CH=CH–C(O)–O–CH$_2$CH$_2$–O–CH$_2$CH$_2$OH)$_2$

6. $n$-$C_4H_9$–Sn($n$-$C_4H_9$)(O–C(O)–CH=CH–C(O)–O–CH$_2$CH$_2$–O–CH$_2$CH$_3$)$_2$

7. $C_6H_{13}$–Sn($C_6H_{13}$)($C_6H_{13}$)(O–C(O)–CH=CH–C(O)–O–CH$_2$CH$_2$OH)

8. $C_{10}H_{21}$–Sn($C_{10}H_{21}$)(O–C(O)–CH=CH–C(O)–O–CH$_2$CH$_2$OH)(O–C(O)–C$_5$H$_{11}$)

9. iso-$C_4H_9$–Sn(phenyl-S)(O–C(O)–CH=CH–C(O)–O–cyclohexyl)(O–C(O)–CH=CH–C(O)–O–CH$_2$CH$_2$–O–CH$_3$)

10. iso-$C_8H_{17}$–Sn($C_{11}H_{23}$)(O–C(O)–CH=CH–C(O)–O–$C_8H_{17}$-iso)(O–C(O)–CH=CH–C(O)–O(CH$_2$)$_3$–O–(CH$_2$)$_3$–OH)

11. iso-$C_3H_7$–Sn(iso-$C_3H_7$)(O–C(O)–CH=CH–C(O)–O–CH$_2$CH$_2$OH)$_2$ 12. iso-$C_3H_7$–Sn($C_7H_{15}$)($C_7H_{15}$)(O–C(O)–CH=CH–C(O)–O–CH$_2$–C(CH$_3$)$_2$–CH$_2$OH)

13. $n$-$C_8H_{17}$–Sn($n$-$C_8H_{17}$)($n$-$C_8H_{17}$)(O–C(O)–CH=CH–C(O)–O–CH$_2$CH$_2$OH)

14. (phenyl-S)–Sn(iso-$C_4H_9$)(iso-$C_4H_9$)(O–C(O)–CH=CH–C(O)–O–CH$_2$CH$_2$OH)

15. 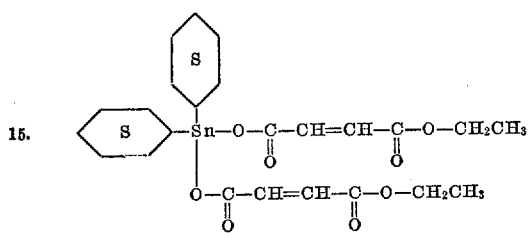

16. 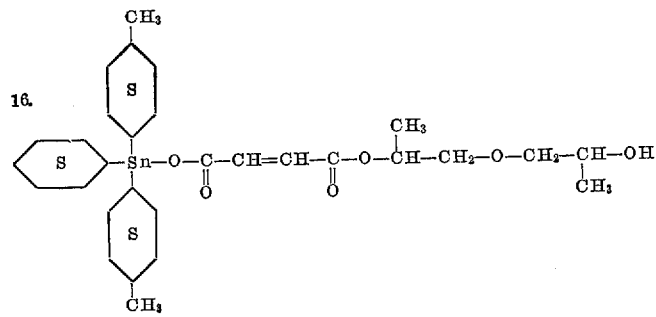

17. 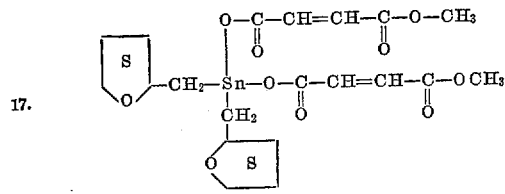

18. 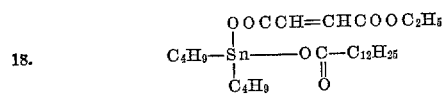

These compounds are readily prepared by conventional methods as by reacting the corresponding organotin oxides with the appropriate organic carboxylic acids. A typical reaction for such a preparation is as follows:

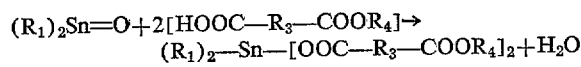

Additional details on the preparation of organotin compounds can be had by reference to the publication, "The Development of the Organotin Stabilizers" by H. Verity Smith (The Tin Research Institute, Middlesex, England, 1959).

The second component of the stabilizing combination of this invention is a phenol compound containing at least one hydrogen atom ortho to at least one phenolic hydroxyl group. The phenol compound, in addition, preferably does not contain two free hydroxyl groups para to each other on any phenyl ring as in hydroquinone. The aromatic portion of the molecule can be substituted or unsubstituted.

The preferred phenol compounds are phenol having the structure

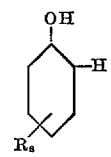

wherein R can be hydrogen, alkyl, aryl, alkenyl, alkaryl, aralkyl, cycloalkyl hydrocarbon groups containing from one to 30 carbon atoms, heterocyclic, alkoxy, halogen or acyl

where R' is aryl, alkyl or hydrogen], and $s$ is an integer from one to four.

Representative monocyclic phenols include guaiacol, resorcinol monoacetate, vanillin, butyl salicylate, 2-tertiary butyl-4-methoxy phenol, nonyl phenol, dodecyl phenol, 2,4-dinonyl phenol, phenyl phenol, 2,3,4,5-tetradecyl phenol, tetrahydroalpha-naphthol, eugenol, isoeugenol, thymol, glyerine monosalicylate, methyl-p-hydroxybenzoate, ethyl-p-hydroxy-cinnamate, 4-benzyloxyphenol, p-acetylaminophenol, p-stearoyl-aminophenol, p-dichlorobenzoylaminophenol and p-hydroxysalicylanilide.

In the case of bicyclic phenols, the rings can be linked by oxyether groups or by alkylene, alicyclidene or arylidene groups. Such bicyclic phenols can be defined by the formula:

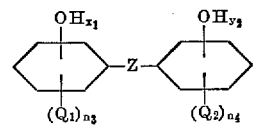

wherein Z is a single bond or an oxygen atom or an alkylene or alicyclidene or arylene or a mixed alkylene-alicyclidene or alkylene-arylidene group, having a straight or branched chain, whose total number of carbon atoms preferably ranges from one to about ten, $y_1$ and $y_2$ are the number of phenolic hydroxyl groups OH, $n_3$ and $n_4$ are the number of R groups, and $Q_1$ and $Q_2$ are hydrogen or alkyl of one to about ten carbon atoms. Preferably, the OH groups are ortho and/or para to Z, and there must be a hydrogen atom ortho to at least one OH group in the molecule.

The sum of $y$ and $n$ in each ring cannot, of course, exceed five.

Typical Z groups are

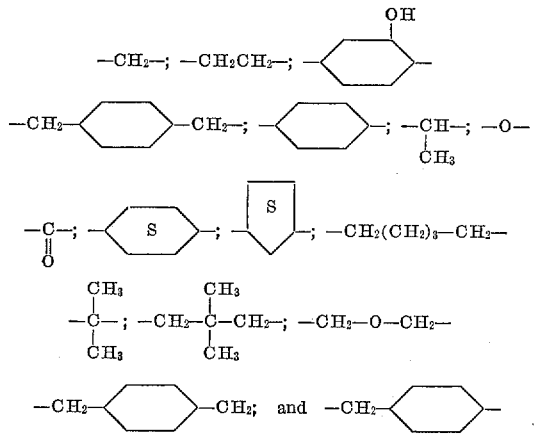

The various Z and Q groups are exemplified in the following compounds.

Exemplary polyhydric phenols are 2,2-bis(4-hydroxy phenyl) propane,
methylene-bis-(p-cresol),
4,4'-oxobis-(3-methyl-6-isopropyl phenol),
2,2'-oxobis-(4-dodecyl phenol),
4,4'-n-butylidenebis-(2-tertiary butyl-5-methylphenol),
4,4'-benzylidenebis-(2-tertiary butyl-5-methylphenol),
4,4'-cyclohexylidenebis-(2-tertiary butylphenol),
1,1',3 - tris - (2' - methyl - 4' - hydroxy - 5' - tertiary butylphenyl) butane.

These stabilizing combinations, as has been indicated are particularly effective stabilizers for polyvinyl chloride resins of all types, by whatever process they are prepared, including solution-polymerized, emulsion-polymerized and suspension-polymerized resins, to name only a few. The term "polyvinyl chloride" as used herein is inclusive not only of polyvinyl chloride homopolymers of all types, and after-chlorinated polyvinyl chloride, but also of copolymers of vinyl chloride in a major proportion, and other copolymerizable monomers in minor proportion, such as copolymers of vinyl chloride and vinyl acetate, copolymers of vinyl chloride and vinylidene chloride, copolymers of vinyl chloride and acrylonitrile, copolymers of vinyl chloride with maleic or fumaric acid esters and copolymers of vinyl chloride with styrene, and also mixtures of polyvinyl chloride resins in a major proportion with a minor proportion of other synthetic resins, such as chlorinated polyethylene, or copolymers of acrylonitrile, butadiene and styrene. Among the polyvinyl chlorides which can be uniaxially-stretch-oriented polyvinyl chloride described in U.S. Patent No. 2,984,593 to Isaksem et al., that is, syndiotactic polyvinyl chloride, as well as atactic and isotactic polyvinyl chlorides.

The amount of phenol and organotin compound employed is sufficient to impart the stabilizing effect desired. A polyvinyl chloride resin composition which is to be subjected to high temperatures will ordinarily require a larger amount of the stabilizing combination of the invention. An amount of phenol as little as 0.01 part by weight per 100 parts of polyvinyl chloride resin will enhance the stabilizing effect of the organotin compound, and such as amount together with an amount of organotin compound as little as 0.25 part by weight per 100 parts of polyvinyl chloride resin will, in general, give a polyvinyl chloride resin composition stable at temperatures up to 375° F. or higher. There is no critical upper limit on the amount of either phenol or organotin compound. At amounts beyond about 2 parts of phenol and about 10 parts of organotin compound, the increase in stabilizing effect may not be commensurate with the amount that is employed, and such amounts accordingly, may be wasteful, and uneconomic. However, larger amounts than these can be employed, and may be necessary under some conditions. Preferably, for optimum results, the amount of phenol is within the range from about 0.01 to about 2 parts, and the amount of organotin compound is within the range from about 0.5 to about 5 parts, by weight per 100 parts of resin.

The stabilizing combination of this invention can, if desired, be employed in conjunction with other stabilizers for polyvinyl chloride resins, such as, for example, organic compounds containing at least one epoxy group. Typical organic epoxy compounds are described in U.S. Patent No. 2,997,454, the disclosure of which is hereby incorporated by reference. Such additional stabilizers can be used where special stabilization effects are desired. Ultraviolet absorbers can be utilized in conjunction with the stabilizing combination of the invention.

Should the stabilizer combination of the invention be employed together with other polyvinyl chloride resin stabilizers, the amount of the stabilizer combination of the invention together with the other stabilizer will be sufficient to impart the desired stabilizing effect. The stabilizer combination of the invention in such event will be the major stabilizer, and the additional stabilizer will supplement the stabilizing action of the former, the amount of the stabilizer combination being within the range from about 0.26 to about 12 parts by weight per 100 parts of the resin, and the additional stabilizer being in an amount of from about 0.05 to about 10 parts per 100 parts of the resin.

These stabilizing combinations, as has been indicated, are particularly effective stabilizers for rigid polyvinyl chloride resin compositions, that is, resin compositions which are formulated to withstand high temperatures of the order of 375° F. and higher. A small degree of plasticization of such polymers is permissible provided this does not reduce the softening point of the resin to below the temperature to which it must be subjected. Such partially plasticized but still rigid resin compositions do not contain more than about 10% by weight of plasticizer. most rigid compositions generally contains no plasticizer at all.

A small amount, usually not more than 1.5%, of a parting agent, also can be included. Typical parting agents are the higher aliphatic acids and salts having from twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

The preparation of the stabilized composition is easily accomplished by conventional procedures. The selected stabilizer combination ordinarily is blended with the polyvinyl chloride resin, using, for instance, plastic mixing rollers, at a temperature at which the mix is fluid and thorough blending facilitated, milling the stabilizer with the resin on a 2-roll mill at from 300 to 400° F. for a time sufficient to form a homogeneous sheet, five minutes, usually. After the mass is uniform, it is sheeted off in the usual way.

The following examples in the opinion of the inventor represent preferred embodiments of polyvinyl chloride resin compositions of his invention and exhibit the synergistic effect obtained thereby.

EXAMPLE I

A series of formulations was prepared having the following composition.

Plastic composition:                                   Parts by weight
  Geon 103 Ep (homopolymer of polyvinyl
    chloride) _____ 150
  Mineral oil _____ 0.75

The stabilizer was added in the proportion noted in Tables I and II, and was blended with the polyvinyl chloride and the mixture was fused on a two-roll mill and then tested in an oven at 350° F. and 375° F. for heat stability. The discoloration and clarity were noted, and the color is reported in Tables I and II below wherein Table I refers to the tests conducted at 350° F. and Table II to the tests conducted at 375° F.

EXAMPLE III

The following materials were prepared in accordance with the procedure of Example I and tested for color and clarity at 350° F. and 375° F. Colors are reported in Tables III and IV, respectively.

TABLE I
[350° F.]

| Time of Heating | Composition Number | | | |
|---|---|---|---|---|
| | A | B | C | D |
| | Stabilizing Composition | | | |
| | 4.5 parts dibutyl tinbis-dipropylene glycol maleate | 0.1 part 4,4'-butylidene-bis-2-t-butyl-5-methylphenol | 4.25 parts DBT bis DPGM* plus 0.1 part 4,4'-butylidene-bis-2-t-butyl-5-methylphenol | 4.5 parts dibutyl tin dioctyl thioglycolate |
| | Color | Color | Color | Color |
| Initial | Colorless | Colorless | Colorless | Colorless. |
| After 15 min | Very pale yellow | Red | do | Do. |
| After 30 min | do | Dark brown | do | Do. |
| After 45 min | Pale yellow | | Very pale yellow | Very pale yellow. |
| After 60 min | Yellow | | do | Pale yellow. |
| After 75 min | do | | do | Light yellow. |
| After 90 min | Deeper yellow | | Pale yellow | Do. |
| After 105 min | Yellow brown | | Light yellow | Do. |
| After 120 min | Charred | | do | Yellow. |

*Dibutyl tin-bis-dipropylene glycol maleate.

TABLE II
[375° F.]

| Time of Heating | Composition Number | | | |
|---|---|---|---|---|
| | A | B | C | D |
| | Stabilizing Composition | | | |
| | 4.5 parts dibutyl tinbis-dipropylene glycol maleate | 0.1 part 4,4'-butylidene-bis-2-t-butyl-5-methylphenol | 4.25 parts DBT bis DPGM* plus 0.1 part 4,4'-butylidene-bis-2-t-butyl-5-methylphenol | 4.5 parts dibutyl tin dioctyl thioglycolate |
| | Color | Color | Color | Color |
| Initial | Colorless | Colorless | Colorless | Colorless. |
| After 15 min | Pale yellow | Dark brown | Very pale yellow | Pale yellow. |
| After 30 min | Yellow | | Pale yellow | Do. |
| After 45 min | Brownish yellow | | do | Yellow. |
| After 60 min | Olive | | Yellow | Do. |
| After 75 min | Brown | | Brownish yellow | Orange yellow. |
| After 90 min | | | do | Orange brown. |
| After 105 min | | | Brown | Brown. |
| After 120 min | | | Darker brown | Deep brown. |

*Dibutyl tin-bis-dipropylene glycol maleate.

The results clearly indicate that at both 350° F. and 375° F. the stabilizer compositions of this invention, exemplified by Composition C, have a stabilizing effect upon rigid polyvinyl chloride resins which is better than that of a typical sulphur-containing organotin stabilizer compound, dibutyl tin dioctyl thioglycolate, illustrated by Composition D. Composition D was observed to have a very pronounced and foul odor whereas Composition C, the composition embodying the stabilizer composition of this invention, did not exhibit any appreciable odor.

Compositions A, B and C together clearly indicate the synergistic effect obtained by means of this invention. Thus the result obtained either with A, dibutyl tin-bis-dipropylene glycol maleate alone, or with B, 4,4'-butylidene-bis-2-t-butyl-5-methylphenol alone, are in no way comparable to the very favorable results obtained with C, the composition employing the two compounds together.

Plastic composition: Parts by weight
    Geon 103 Ep (homopolymer of polyvinyl chloride) _____ 150
    Mineral oil _____ 0.75
    Dibutyl tin-bis-dipropylene glycol maleate ___ 4.25
    Unhinded phenol listed in Tables III and IV _____ 0.10

The tabulated results indicate the superior stabilizing action imparted to polyvinyl chloride by means of this invention. Compositions E–H, using the combination of this invention, were stabilized against heat deterioration as well or better than Composition D which contained a conventional organotin sulfur-containing compound. In addition, Compositions E–H did not exhibit the unpleasant odor characteristic of sulfur compounds.

TABLE III
[350° F.]

| Time of Heating | Composition Number | | | |
|---|---|---|---|---|
| | E | F | G | H |
| | Phenol | | | |
| | 2-t-butyl-4-methoxyphenol | 4-benzyloxyphenol | Nonylphenol | 2,2'-bis-(4-hydroxyphenyl) propane |
| | Color | Color | Color | Color |
| Initial | Colorless | Colorless | Colorless | Colorless. |
| After 15 min | Very pale yellow | Very pale yellow | do | Very pale yellow. |
| After 30 min | do | do | Very pale yellow | Do. |
| After 45 min | do | do | do | Do. |
| After 60 min | Pale yellow | Pale yellow | do | Do. |
| After 75 min | do | do | Pale yellow | Light yellow. |
| After 90 min | do | do | Light yellow | Do. |
| After 105 min | do | do | do | Yellow. |
| After 120 min | do | do | Yellow | Do. |

TABLE IV
[375° F.]

| Time of Heating | Composition Number | | | |
|---|---|---|---|---|
| | E | F | G | H |
| | Phenol | | | |
| | 2-t-butyl-4-methoxyphenol | 4-benzyloxyphenol | Nonylphenol | 2,2'-bis-(4-hydroxyphenyl) propane |
| | Color | Color | Color | Color |
| Initial | Colorless | Colorless | Colorless | Colorless. |
| After 15 min | Pale yellow | Pale yellow | Very pale yellow | Slight yellow. |
| After 30 min | do | do | Pale yellow | Pale yellow. |
| After 45 min | Light yellow | Light yellow | Yellow | Yellow. |
| After 60 min | Yellow | Yellow | Deep yellow | Deep yellow. |
| After 75 min | Deep yellow | Deep yellow | Dark olive | Dark brown. |
| After 90 min | Light olive | Olive | Dark brown | Do. |
| After 105 min | Brown | Brown | do | Do. |
| After 120 min | Dark brown | Dark brown | do | Do. |

EXAMPLE III

In accordance with the procedure of Example I, the following ingredients were compounded and tested at 350° F. The colors obtained are reported in Table V.

Plastic composition: Parts by weight
Geon 103 Ep _____ 150
4,4'-butylidene-bis-2-t-butyl-5-methylphenol __ 0.10
Organotin compound _____ As indicated
Mineral oil _____ 0.75

As in the case of the preceding examples, Compositions J–M exhibited good stability at 350° F. without exhibiting the unpleasant odor characteristic of sulfur compounds.

and 10% vinyl acetate. The stabilizer combination employed was 4.0 parts of dibutyl tin bis-(monoisooctyl maleate) and 0.08 part of 4,4'-butylidene-bis-(2-t-butyl-5-methyl phenol). The resulting composition remained colorless for a substantial period of time and had only yellowed slightly at the end of two hours of heating at 350° F., indicating that the stabilizer combinations of this invention are also applicable to copolymers of vinyl chloride and vinyl acetate.

EXAMPLE V

The procedure of Example I was followed using different stabilizer combinations as noted and testing the compositions at 350° F. Results are indicated in Table VI.

TABLE V

| Time of Heating | Composition Number | | | |
|---|---|---|---|---|
| | J | K | L | M |
| | Organotin Compound | | | |
| | 4.25 parts of dibutyl tin-bis-(dipropylene glycol maleate) | 4.25 parts of dibutyl tin-bis-(2-phenoxyethyl maleate) | 3.6 parts of dibutyl tin-bis-(2-ethoxyethyl maleate) | 3.8 parts of dibutyl tin-bis-(diethylene glycol maleate) |
| | Color | Color | Color | Color |
| Initial | Colorless | Colorless | Very pale yellow | Pale yellow. |
| After 15 min | Very pale yellow | do | Pale yellow | Do. |
| After 30 min | do | Very pale yellow | do | Do. |
| After 45 min | Pale yellow | do | do | Do. |
| After 60 min | do | Pale yellow | do | Yellow. |
| After 75 min | do | do | do | Do. |
| After 90 min | Light yellow | do | Yellow | Do. |
| After 105 min | do | do | do | Do. |
| After 120 min | do | Light yellow | do | Deep yellow. |

EXAMPLE IV

The procedure of Example I was repeated, using as the resin 127.5 parts of "Vinylite VYHH," a copolymer of 87% vinyl chloride and 13% vinyl acetate, and 22.5 parts of "Vinylite VYNS," a copolymer of 90% vinyl chloride Plastic composition: Parts by weight
Geon 103 Ep _____ 150
Mineral oil _____ 0.75
4,4'-butylidene-bis-2-t-butyl-5-methylphenol __ 0.1
Organotin compound _____ As noted The results indicate that good stabilization may be obtained with many different organotin compounds used in conjunction with a phenol.

TABLE VI

| | Composition Number | | | |
|---|---|---|---|---|
| | Q | R | S | T |
| | Organotin Compound | | | |
| | 4.15 parts tri-n-octyl tin monoisooctyl maleate | 5.0 parts di-n-octyl tin bis-(dipropylene glycol monomaleate) | 4.25 parts dibutyl tin bis-(dipropylene glycol monomaleate) | 4.2 parts dibutyl tin bis-(monoisooctyl fumarate) |
| Time of Heating | Color | Color | Color | Color |
| Initial | Colorless | Colorless | Colorless | Colorless. |
| After 15 min | Very pale yellow | Very pale yellow | Very pale yellow | Very pale yellow. |
| After 30 min | do | do | do | Do. |
| After 45 min | Pale yellow | Pale yellow | do | Do. |
| After 60 min | do | do | do | Do. |
| After 75 min | Yellow | do | Pale yellow | Do. |
| After 90 min | do | Light yellow | do | Pale yellow. |
| After 105 min | do | do | do | Do. |
| After 120 min | Deeper yellow | do | do | Do. |

EXAMPLE VI

This example illustrates the use of varying amounts of phenol compound in the stabilizer combination. The procedure of Example I was followed, with testing being carried out at 350° F. and 375° F. Results are tabulated in Tables VII and VIII.

Plastic composition: Parts by weight
- Geon 103 Ep _____ 150.
- Mineral oil _____ 0.75.
- Dibutyl tin-bis-(dipropylene glycol monomaleate) 4.25.
- 4,4'-butylidene-bis-2-t-butyl-5-methylphenol). As noted in Tables VII and VII.

The results indicate that the amount of phenol added to the composition may be varied widely without exerting an adverse effect upon the stabilization of the resin.

EXAMPLE VII

A polyvinyl chloride polymer formulation was prepared having the following composition.

Plastic composition: Parts by weight
- Geon 103 Ep (homopolymer of polyvinyl chloride) _____ 240
- Du Pont LD 313 (a chlorinated polyethylene containing approximately 38% chlorine) ___ 60
- Isooctyl epoxystearate _____ 10

The composition was then divided into two equal parts, identified as compositions Y and Z. To composition Y, 4.2 parts of dibutyl tin-(bis-isooctylmaleate) and 0.1 part of 2-t-butyl-4-methoxyphenol were added. To composition Z, 4.5 parts of dibutyl tin bis-isooctyl thioglycolate were added.

Both compositions, which were colorless, were then heated at 350° F. for two hours. At the end of this time,

TABLE VII
[350° F.]

| | Composition Number | | | |
|---|---|---|---|---|
| | U | V | W | X |
| | Parts of Phenol Compound | | | |
| | 0.03 | 0.06 | 0.1 | 0.2 |
| Time of Heating | Color | Color | Color | Color |
| Initial | Colorless | Colorless | Colorless | Colorless. |
| After 15 min | Very pale yellow | Very pale yellow | Very pale yellow | Very pale yellow. |
| After 30 min | Pale yellow | Pale yellow | Pale yellow | Pale yellow. |
| After 45 min | Light yellow | Light yellow | Light yellow | Do. |
| After 60 min | do | do | do | Light yellow. |
| After 75 min | do | do | do | Do. |
| After 90 min | do | do | do | Do. |
| After 105 min | do | do | do | Do. |
| After 120 min | do | do | do | Do. |

TABLE VIII
[375° F.]

| | Composition Number | | | |
|---|---|---|---|---|
| | U | V | W | X |
| | Parts of Phenol Compound | | | |
| | 0.03 | 0.06 | 0.1 | 0.2 |
| Time of Heating | Color | Color | Color | Color |
| Initial | Colorless | Colorless | Colorless | Colorless. |
| After 15 min | Very pale yellow | Very pale yellow | Very pale yellow | Very pale yellow. |
| After 30 min | Pale yellow | Pale yellow | Pale yellow | Pale yellow. |
| After 45 min | Light yellow | Light yellow | Light yellow | Light yellow. |
| After 60 min | do | Yellow | Yellow | Yellow. |
| After 75 min | Yellow | do | do | Deep yellow. |
| After 90 min | Brown-yellow | Brown-yellow | Brown-yellow | Olive. |
| After 105 min | Brown | Brown | Brown | Brown. |
| After 120 min | Dark brown | Dark brown | Dark amber | Dark brown. | both compositions were substantially identical in their light yellow color. Composition Z gave off an unpleasant odor characteristic of sulfur compounds whereas composition Y, employing the stabilizer combination of this invention, was substantially odorless.

This example illustrates the fact that the invention is applicable to mixtures of polymers in which polyvinyl chloride is predominant. It also illustrates the use of a supplemental epoxy stabilizer along with the stabilizer combination of the invention. In this example, the supplemental stabilizer is isooctyl epoxy-stearate.

EXAMPLE VIII

To show that 10% plasticizer does not affect the advantageous properties of the rigid compositions of this invention, the following materials were blended as in Example I and tested for heat stability at 350° F. and 370° F.

Plasic composition: Parts by weight
  Geon 103 Ep (polyvinyl chloride homopolymer). 150.
  Diisooctyl phthalate (plasticizer) _____ 15.
  Parting agent _____ As noted in Tables IX and X.
  Stabilizer _____ As noted in Tables IX and X.

The results tabulated in Tables IX and X show that composition BB embodying the stabilizer combination of this invention retains its light color for longer periods of time than do polyvinyl chloride compositions which do not use the stabilizing combination. It is to be particularly noted that dibutyltin diacetate, which is not an organotin compound of this invention, in combination with 2,2'-bis(4-hydroxyphenyl) propane or 4,4'-butylidene-bis-(2-t-butyl-5-methylphenol) as seen in compositions EE and GG, was not effective as a stabilizer for polyvinyl chloride resin.

TABLE IX
[350° F.]

| | Composition Number | | | |
|---|---|---|---|---|
| | AA | BB | CC | DD |
| | Stabilizing Composition | | | |
| | 4.5 parts Dibutyltin di(isooctyl maleate) | 4.4 parts Dibutyltin di(isooctyl maleate) 0.1 part 4,4'-butylidene-bis (-2-t-butyl-5-methylphenol) | 2.8 parts Dibutyltin diacetate | 1.5 parts 2,2'-bis(4-hydroxyphenyl)propane |
| | Parting Agent | | | |
| | 0.3 part Lubricant (1,2-butylene glycol esters of Montan wax acids) | 0.3 part Lubricant (1,2-butylene glycol esters of Montan wax acids) | 0.75 part Mineral Oil | 0.75 part Mineral Oil |
| Time of Heating | Color | Color | Color | Color |
| Initial | Colorless | Colorless | Colorless | Light pink. |
| After 15 min | Very pale yellow | Very pale yellow | Intense yellow | Dark brown-red. |
| After 30 min | Pale yellow | ____do____ | Dark yellow | Very dark brown-red. |
| After 45 min | ____do____ | ____do____ | Very dark yellow | Very dark brown. |
| After 60 min | Yellow | Pale yellow | ____do____ | |
| After 75 min | ____do____ | ____do____ | ____do____ | |
| After 90 min | ____do____ | ____do____ | Very dark yellow with black edges | |
| After 105 min | ____do____ | ____do____ | Yellow with black areas and edges | |
| After 120 min | ____do____ | ____do____ | | |

| | Composition Number | | |
|---|---|---|---|
| | EE | FF | GG |
| | Stabilizing Composition | | |
| | 2.8 parts Dibutyltin diacetate 0.2 part 2,2'-bis(4-hydroxyphenyl)-propane | 1.5 parts 4,4-butylidene bis (-2-t-butyl-5-methyl phenol) | 2.8 parts Dibutyltin diacetate 0.25 part 4,4'-butylidene-bis(-2-t-butyl-5-methylphenol) |
| | Parting Agent | | |
| | 0.75 part Mineral Oil | 0.75 part Mineral Oil | 0.75 part Mineral Oil |
| Time of Heating | Color | Color | Color |
| Initial | Colorless | Light pink | Very pale yellow. |
| After 15 min | Pale yellow | Dark brown-red | Yellow-orange. |
| After 30 min | Intense yellow | Very dark brown-red | Orange. |
| After 45 min | Very dark yellow | ____do____ | Dark orange. |
| After 60 min | ____do____ | Black | Very dark orange with trace of black edge. |
| After 75 min | ____do____ | ____do____ | Very dark orange with black edge. |
| After 90 min | Very dark yellow with black edges | | Do. |
| After 105 min | Yellow with black areas and edges | | Black |
| After 120 min | | | |

TABLE X
[375° F.]

| | Composition Number | | | |
|---|---|---|---|---|
| | AA | BB | CC | DD |
| | Stabilizing Composition | | | |
| | 4.5 parts Dibutyltin di(isooctyl maleate) | 4.4 parts Dibutyltin di(isooctyl maleate) 0.1 part 4,4'-butylidene-bis (-2-t-butyl-5-methylphenol) | 2.8 parts Dibutyltin diacetate | 1.5 parts 2,2'-bis(4-hydroxyphenyl)propane |
| | Parting Agent | | | |
| | 0.3 part Lubricant (1,2-butylene glycol esters of Montan wax acids) | 0.3 part Lubricant (1,2-butylene glycol esters of Montan wax acids) | 0.75 part Mineral Oil | 0.75 part Mineral Oil |
| Time of Heating | Color | Color | Color | Color |
| Initial | Colorless | Colorless | Colorless | Light pink. |
| After 15 min | Pale yellow | Very pale yellow | Intense yellow | Dark brown-red. |
| After 30 min | do | do | Very dark yellow | Very dark brown. |
| After 45 min | Yellow | Pale yellow | Very dark yellow with black edges | |
| After 60 min | Yellow with faint brown edges | do | Black | |
| After 75 min | Yellow with brown edges | do | | |
| After 90 min | Black | Yellow with faint brown edges | | |

| | Composition Number | | |
|---|---|---|---|
| | EE | FF | GG |
| | Stabilizing Composition | | |
| | 2.8 parts Dibutyltin diacetate 0.2 part 2,2'-bis(4-hydroxyphenyl)-propane | 1.5 parts 4,4'-butylidene bis (-2-t-butyl-5-methyl phenol) | 2.8 parts Dibutyltin diacetate 0.25 part 4,4'-butylidene-bis(-2-t-butyl-5-methylphenol) |
| | Parting Agent | | |
| | 0.75 part Mineral Oil | 0.75 part Mineral Oil | 0.75 part Mineral Oil |
| Time of Heating | Color | Color | Color |
| Initial | Colorless | Light pink | Colorless. |
| After 15 min | Intense yellow | Dark brown-red | Dark yellow. |
| After 30 min | Dark yellow | Very dark brown-red | Very dark yellow-orange. |
| After 45 min | Very dark yellow with black edges | | Orange with black edges. |
| After 60 min | do | | Black with orange areas. |
| After 75 min | | | Black. |

Having regard to the foregoing disclosure, the following is claimed as the inventive and patentable embodiments thereof:

1. A rigid polyvinyl chloride resin composition containing less than about 10% by weight of plasticizer and having increased resistance to deterioration when heated at 375° F. consisting essentially of (a) a polyvinyl chloride resin; (b) an organotin compound having the structure:

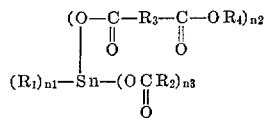

wherein $R_1$ and $R_2$ are selected from the group consisting of hydrocarbon groups and inertly substituted hydrocarbon groups having from one to about thirty carbon atoms, $R_3$ is a hydrocarbon group having from one to about thirty carbon atoms containing an ethylenic double bond alpha to the carboxyl group

$R_4$ is an organic group derived from a monohydric or dihydric alcohol, $n_1$ is at least two, $n_2$ is at least one, $n_3$ is from zero to one, and the sum of $n_1$, $n_2$ and $n_3$ is four; (c) a phenol compound having at least one hydrogen atom at a position ortho to a phenolic hydroxyl group selected from the group consisting of phenols having the structure

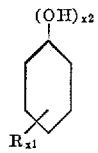

wherein R is selected from the group consisting of hydrogen, halogen, and the following organic radicals having from one to thirty carbon atoms: hydrocarbon, aromatic ring condensed with the phenol ring, heterocyclic, alkoxy and acyl

where R' is aryl, alkyl or hydrogen; $x_1$ and $x_2$ are integers from one to four, the sum of $x_1$ and $x_2$ not exceeding 6; and phenols having the structure

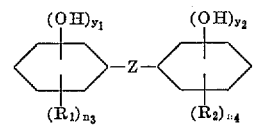

where Z is selected from the group consisting of a single bond, oxygen, alkylene, alicyclidene, arylene, alkylene-alicyclidene, and alkylene-arylidene, $R_1$ and $R_2$ are selected from the group consisting of hydrogen and alkyl having from one to about ten carbon atoms, and $y_1$, $y_2$, $n_3$ and $n_4$ are integers, the sum of $y_2$ and $n_4$ is five, and the sum of $y_1$ and $n_3$ is four; said phenol compound being present in an amount to enhance the stabilizing effect of the organotin compound.

2. A composition as in claim 1 wherein the phenol compound includes at least two aromatic rings and wherein the phenol compound contains one phenolic hydroxyl group attached to each aromatic ring.

3. A composition as in claim 1 wherein the phenol compound is 4,4' - butylidene - bis - (2-t-butyl-5-methylphenol).

4. A composition as in claim 1 wherein the phenol compound is 2-t-butyl-4-methoxyphenol.

5. A composition as in claim 1 wherein the phenol compound is nonylphenol.

6. A composition as in claim 1 wherein the phenol compound is 2,2'-bis-(4-hydroxyphenyl) propane.

7. A composition as in claim 1 also containing an organic epoxy compound as a supplemental stabilizer.

8. A rigid polyvinyl chloride resin composition containing no plasticizer and having increased resistance to deterioration when heated at 375° F. consisting essentially of (a) a polyvinyl chloride resin; (b) an organotin compound having the structure

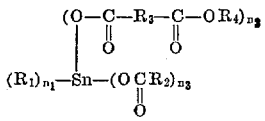

wherein $R_1$ and $R_2$ are selected from the group consisting of hydrocarbon groups and inertly substituted hydrocarbon groups having from one to about thirty carbon atoms, $R_3$ is a hydrocarbon group having from one to about thirty carbon atoms containing an ethylenic double bond alpha to the carboxyl group

$R_4$ is an organic group derived from a monohydric or dihydric alcohol, $n_1$ is at least two, $n_2$ is at least one, $n_3$ is from zero to one, and the sum of $n_1$, $n_2$ and $n_3$ is four; (c) a phenol compound having at least one hydrogen atom at a position ortho to a phenolic hydroxyl group selected from the group consisting of phenols having the structure

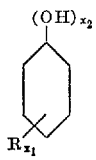

wherein R is selected from the group consisting of hydrogen, halogen and the following organic radicals having from one to thirty carbon atoms: hydrocarbon, aromatic ring condensed with the phenol ring, heterocyclic, alkoxy, and acyl

where R' is aryl, alkyl, or hydrogen; $x_1$ and $x_2$ are integers from one to four, the sum of $x_1$ and $x_2$ not exceeding 6; and phenols having the structure

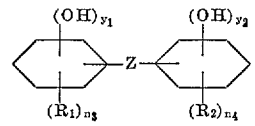

where Z is selected from the group consisting of a single bond, oxygen, alkylene, alicyclidene, arylene, alkylene-alicyclidene and alkylene-arylidene, $R_1$ and $R_2$ are selected from the group consisting of hydrogen and alkyl having from one to about ten carbon atoms, and $y_1$, $y_2$, $n_3$ and $n_4$ are integers, the sum of $y_2$ and $n_4$ is five, and the sum of $y_1$ and $n_3$ is four; said phenol compound being present in an amount to enhance the stabilizing effect of the organotin compound.

References Cited

UNITED STATES PATENTS

| | | | |
|---|---|---|---|
| 2,625,521 | 1/1953 | Fischer et al. | 260—23 |
| 3,019,247 | 1/1962 | Mack et al. | 260—429.7 |
| 3,075,940 | 1/1963 | Pazinski et al. | 260—31.8 |

DONALD E. CZAJA, Primary Examiner

V. P. HOKE, Assistant Examiner

U.S. Cl. X.R.

260—23, 31.8, 45.7, 45.8, 45.85, 45.9, 45.95, 880, 899; 252—400